United States Patent
Rohde et al.

(10) Patent No.: US 9,014,573 B2
(45) Date of Patent: Apr. 21, 2015

(54) PROCESSING DATA IN AN OPTICAL NETWORK ELEMENT

(75) Inventors: Harald Rohde, Munich (DE); Thomas Treyer, Munich (DE)

(73) Assignee: Xieon Networks S.a.r.l., Luxemburg (LU)

( * ) Notice: Subject to any disclaimer, the term of this patent is extended or adjusted under 35 U.S.C. 154(b) by 56 days.

(21) Appl. No.: 13/985,532

(22) PCT Filed: Feb. 13, 2012

(86) PCT No.: PCT/EP2012/052397
§ 371 (c)(1),
(2), (4) Date: Sep. 30, 2013

(87) PCT Pub. No.: WO2012/110449
PCT Pub. Date: Aug. 23, 2012

(65) Prior Publication Data
US 2014/0023370 A1    Jan. 23, 2014

(30) Foreign Application Priority Data

Feb. 14, 2011    (EP) .................................... 11154341

(51) Int. Cl.
*H04B 10/61* (2013.01)
*H04B 10/64* (2013.01)
*H04B 10/60* (2013.01)

(52) U.S. Cl.
CPC ............ *H04B 10/6164* (2013.01); *H04B 10/60* (2013.01)

(58) Field of Classification Search
CPC ....... H04B 10/61; H04B 10/616; H04B 10/64
USPC ................................................ 398/204, 208
See application file for complete search history.

(56) References Cited

U.S. PATENT DOCUMENTS

| | | | |
|---|---|---|---|
| 5,712,639 A * | 1/1998 | Hethuin | 342/47 |
| 6,873,797 B2 * | 3/2005 | Chang et al. | 398/51 |
| 2010/0028024 A1 | 2/2010 | Shpantzer et al. | |

FOREIGN PATENT DOCUMENTS

| | | |
|---|---|---|
| EP | 2026478 A1 | 2/2009 |
| WO | 2010/040377 A1 | 4/2010 |
| WO | 2012/110449 A1 | 8/2012 |

OTHER PUBLICATIONS

Winzer, P.J. et al., "Spectrally Efficient Long-Haul Optical Networking Usint 112-Gb/s Polarization-Multiplexed 16-QAM," Journal of Lighwave Technology, vol. 28(4):547-556 (2010).
European Search Report for Application No. 11154341.9, 6 pages, dated Jul. 27, 2011.
International Search Report and Written Opinion for Application No. PCT/EP2012/052397, 9 pages, dated Mar. 22, 2012.

* cited by examiner

*Primary Examiner* — Leslie Pascal
(74) *Attorney, Agent, or Firm* — Nelson Mullins Riley & Scarborough LLP

(57) ABSTRACT

A method for processing data in an optical network element are provided, wherein the optical network element comprises a local oscillator operating at a first frequency; wherein an incoming data stream is received at a second frequency; wherein the incoming data steam is processed using the first frequency; wherein a first pattern is searched in the incoming data stream; wherein a second pattern is searched in the incoming data stream; and wherein the first pattern corresponds to the first frequency being in the spectrum on one side of the second frequency and the second pattern corresponds to the first frequency being in the spectrum on the other side of the second frequency. Also, a corresponding optical network element and a communication system comprising at least one such optical network element are suggested.

12 Claims, 3 Drawing Sheets

PROCESSING DATA IN AN OPTICAL NETWORK ELEMENT

RELATED APPLICATIONS

This application is a 35 U.S.C. 371 national stage filing of International Application No. PCT/EP2012/052397, filed on Feb. 13, 2012, which claims priority to European Patent Application No. 11 154 341.9, filed on Feb. 14, 2011. The contents of the aforementioned applications are hereby incorporated by reference.

The invention relates to a method for processing data in an optical network element, to a corresponding optical network element and to a communication system comprising at least one such optical network element.

A passive optical network (PON) is a promising approach regarding fiber-to-the-home (FTTH), fiber-to-the-business (FTTB) and fiber-to-the-curb (FTTC) scenarios, in particular as it overcomes the economic limitations of traditional point-to-point solutions.

Several PON types have been standardized and are currently being deployed by network service providers worldwide. Conventional PONs distribute downstream traffic from the optical line terminal (OLT) to optical network units (ONUs) in a broadcast manner while the ONUs send upstream data packets multiplexed in time to the OLT. Hence, communication among the ONUs needs to be conveyed through the OLT involving electronic processing such as buffering and/or scheduling, which results in latency and degrades the throughput of the network.

In fiber-optic communications, wavelength-division multiplexing (WDM) is a technology which multiplexes multiple optical carrier signals on a single optical fiber by using different wavelengths (colors) of laser light to carry different signals. This allows for a multiplication in capacity, in addition to enabling bidirectional communications over one strand of fiber.

WDM systems are divided into different wavelength patterns, conventional or coarse and dense WDM. WDM systems provide, e.g., up to 16 channels in the 3rd transmission window (C-band) of silica fibers of around 1550 nm. Dense WDM uses the same transmission window but with denser channel spacing. Channel plans vary, but a typical system may use 40 channels at 100 GHz spacing or 80 channels at 50 GHz spacing. Some technologies are capable of 25 GHz spacing. Amplification options enable the extension of the usable wavelengths to the L-band, more or less doubling these numbers.

Optical access networks, e.g., coherent Ultra-Dense Wavelength Division Multiplex (UDWDM) networks, are deemed to be a promising approach for future data access.

Data transmission of spectrally densely spaced wavelengths is utilized by applications as Next Generation Optical Access (NGOA) systems allowing high data rates of, e.g., 100 Gbit/s.

Optical transmission systems, e.g., coherent optical transmission systems, in particular use QPSK or higher order modulation formats in a heterodyne reception configuration.

In optical coherent heterodyne receivers, incoming light is superimposed with a local oscillator light of a particular frequency offset. When such a receiver is activated, a relative position of the local oscillator frequency in view of a signal frequency is unknown and the local oscillator's signal is scanned until a signal due to the superposition of the two light waves is detected.

Although it is feasible to determine an absolute frequency difference between the signal light and the local oscillator light (e.g., by counting the frequency or by other frequency measurements), it is not known whether this frequency difference is positive or negative, i.e. to determine whether the signal light is in the spectrum below or above of the local oscillator light (i.e. left or right in the spectrum).

The problem to be solved is to overcome this disadvantage and to provide a fast and efficient solution to detect on which side of the user signal the signal of the local oscillator is located.

This problem is solved according to the features of the independent claims. Further embodiments result from the depending claims.

In order to overcome this problem, a method for processing data in an optical network element is provided
  wherein the optical network element comprises a local oscillator operating at a first frequency;
  wherein an incoming data stream is received at a second frequency;
  wherein the incoming data steam is processed using the first frequency;
  wherein a first pattern is searched in the incoming data stream;
  wherein a second pattern is searched in the incoming data stream;
  wherein the first pattern corresponds to the first frequency being in the spectrum on one side of the second frequency and the second pattern corresponds to the first frequency being in the spectrum on the other side of the second frequency.

It is noted that spectrum refers to a range of frequencies or wavelengths. For example, if the first frequency is on one side of the second frequency, the first frequency may be below the second frequency. In this case the frequency difference amounts to $f_d$. If the first frequency is on the other side of (i.e. above) the second frequency, the frequency difference amounts to $-f_d$. Hence, the first pattern can be used to correctly decode the incoming data stream in case the first frequency is on one side of the second frequency and the second pattern can be used to correctly decode the incoming data stream in case the first frequency is on the opposite side of the second frequency, wherein the absolute distance or difference between the first and the second frequency $|f_d|$ is the same for each case.

This solution bears the advantage that it can be detected whether the first frequency (of the local oscillator) is below or above the second frequency (of the incoming data stream).

The incoming data stream may be any pattern or data that is received at the optical network element. The data stream may be conveyed by or via a centralized optical entity, e.g., an optical line terminal (OLT). The optical network element may be a decentralized component of the optical network, e.g., an optical network unit (ONU).

In an embodiment, the first pattern corresponds to a (detected) second pattern, generated by a frequency inversion (which can also be referred to as "frequency inversion" of the second pattern). It is noted that the first pattern can be generated by frequency inversion of the second pattern or vice versa. For example, symbols "10" in the first pattern correspond to symbols "01" in the second pattern and vice versa, whereas symbols "00" and "11" are the same in the first and the second pattern.

It is also an embodiment that the incoming data stream can be processed using the first frequency and the second frequency, in particular a difference frequency between the first frequency and the second frequency.

In another embodiment, the incoming data stream is modulated by a multi-level phase modulated modulation scheme, in particular an n-ary PSK or an n-ary DPSK.

The modulation scheme may be any quadrature modulation format comprising an In-Phase (I) component and a Quadrature (Q) component. For example, QAM formats, also of higher order, can be used.

In a further embodiment, the first pattern corresponds to a header of a data frame and the second pattern corresponds to a modified header of the data frame.

It is noted that the first bit pattern and the second bit pattern can be derived from each other by, e.g., a fixed, modulation format dependent, mapping scheme.

When the optical network element is in an unlocked state, it may (preferably in parallel) continuously search for the header and the modified header in the incoming data stream.

In a next embodiment, the modified header comprises inverted In-Phase components compared to the In-Phase components of the header. The Quadrature component may be the same for the header and the modified header.

It is also an embodiment that
in an unlocked state the incoming data stream is compared with the header and with the modified header;
the status changes from the unlocked state to a locked state when the header or the modified header is detected;
an almanac information is obtained from the incoming data stream;
a frequency is selected based on the almanac information.

Hence, the almanac information can be read in order to determine which frequency (e.g., free wavelength to be used for this optical network component) the optical network component should log on to. In case the modified header is found, a flag can be set indicating that an inversion of the In-Phase component needs to be conducted in order to correctly decode the frame associated with this modified header.

Said selection of the frequency may comprise tuning of the first frequency, i.e. the frequency of the local oscillator.

Pursuant to another embodiment, the almanac information is obtained from the incoming data stream by inverting the In-Phase symbols in case the modified header has been detected.

According to an embodiment, the first frequency of the local oscillator is tuned to the other side of the second frequency in case the modified header is detected.

The problem stated above is also solved by a device comprising a processing unit that is arranged such that the method as described herein is executable thereon.

It is noted that the steps of the method stated herein may be executable on this processing unit as well.

The problem stated above is further solved by an optical network element
comprising a local oscillator operating at a first frequency;
comprising a processing unit that is arranged
for receiving an incoming data stream at a second frequency;
for processing the incoming data steam using the first frequency;
for searching a first pattern in the incoming data stream;
for searching a second pattern in the incoming data stream;
wherein the first pattern corresponds to the first frequency being in the spectrum on one side of the second frequency and the second pattern corresponds to the first frequency being in the spectrum on the other side of the second frequency.

The processing unit may be part of the optical network element, in particular a receiver of the optical network element.

According to an embodiment, the optical network element is an optical network unit or an optical line terminal.

It is noted that said processing unit can comprise at least one, in particular several means that are arranged to execute the steps of the method described herein. The means may be logically or physically separated; in particular several logically separate means could be combined in at least one physical unit.

Said processing unit may comprise at least one of the following: a processor, a microcontroller, a hard-wired circuit, an ASIC, an FPGA, a logic device.

Furthermore, the problem stated above is solved by a communication system comprising at least one device or optical network element as described herein.

Figure 1:
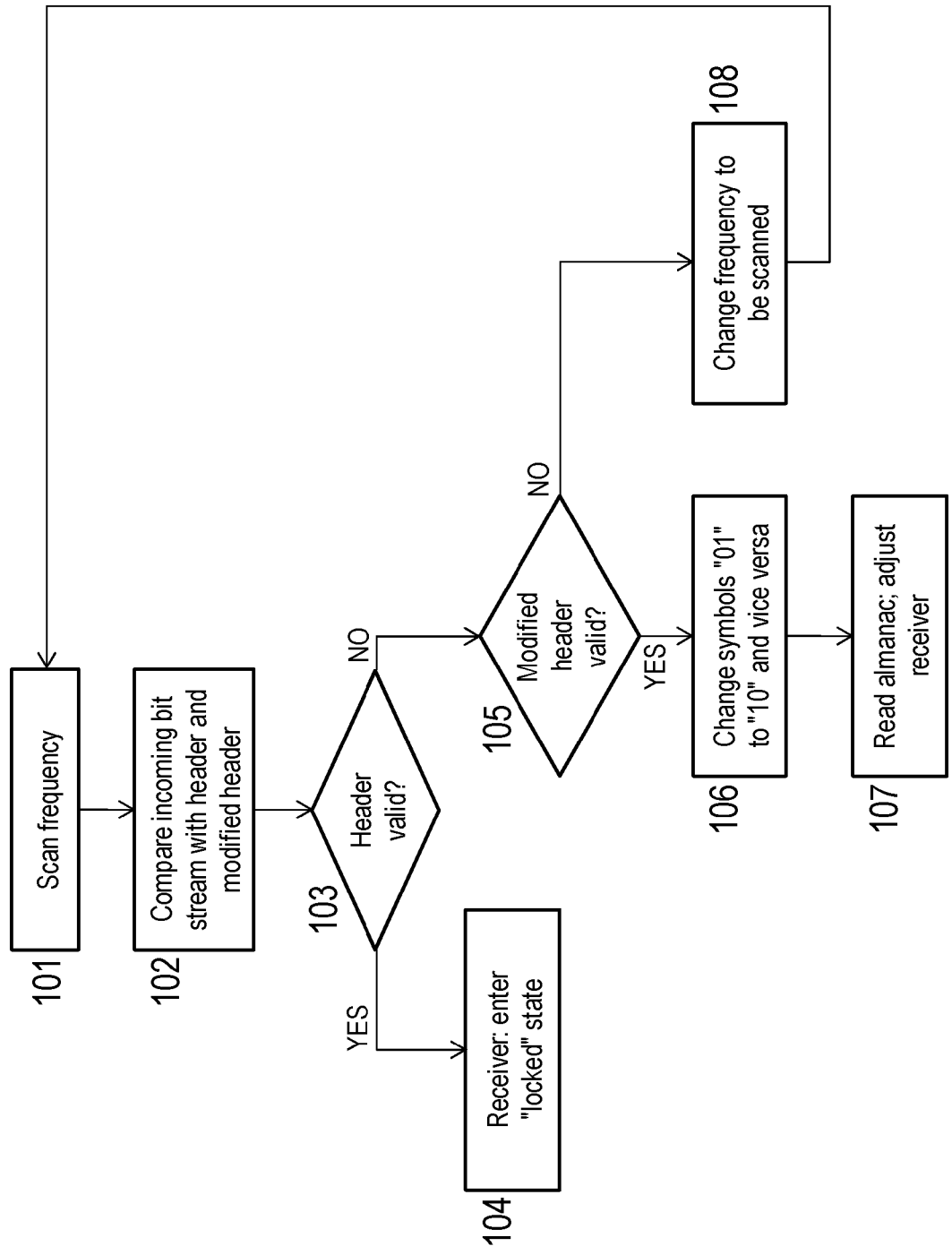
FIG. 1 shows a schematic diagram comprising exemplary steps to be realized to enhance and in particular to accelerate the process of locking onto a signal for an optical receiver located, e.g., at the ONU.

The solution presented allows determining the relative position of a user signal (light signal in the spectrum) in view of a local oscillator signal (also represented as a light signal in the spectrum). Advantageously, this concept does not require frequency measurements or additional tuning of the local oscillator signal.

The approach is in particular applicable for modulated signals according to an n-ary phase shift keying modulation format (also referred to as nPSK modulation format). The nPSK modulation format comprises in particular differential n-ary PSK modulation formats ("DnPSK"), in particular multi-level PSK modulation formats also comprising QAM, in particular m-ary QAM with m larger or equal 4.

When an intermediate frequency (IF) is inverted, i.e. changes from a positive frequency to a negative frequency, the Quadrature (Q) component of the signal keeps the same while the In-Phase (I) component is inverted.

For example, 2-bit symbols can be mapped to phase angles such that the first bit corresponds to the I component and the second bit corresponds to the Q component, i.e. "00" corresponds to 0°, "01" corresponds to 90°, "10" corresponds to 180° and "11" corresponds to 270°. A frequency inversion results in unchanged angles for 0° and 180° but exchanges the 2-bit symbols for 90° and 270°. Thus, in the inverted frequency case, the bit sequences "10" and "01" are swapped to recover the original data stream.

Payload data can be conveyed via frames. A superimposed frame structure may contain additional information about the payload and, in particular, it may comprise a frame header, which can be used at the receiver side to synchronize the receiver with the data frame received. For example, a frame may contain a hexadecimal header like "F6 F6 F6 28 28 28" (which may also be used as a frame delimiter).

When the receiver is not in a locked state, the receiver continuously compares an incoming bit stream with that frame header until a match is found. The receiver then changes its state from "unlocked" to "locked" and is thus (at least for the duration of a frame, which may contain, e.g., 16340 bytes) synchronized with the incoming bit stream.

The solution presented herein in particular suggests searching for the header as described and at the same time searching for a pattern that corresponds to a local oscillator at a negative frequency. For example, if the hexadecimal pattern of the header is $$F6\ F6\ F6\ 28\ 28\ 28 \tag{1}$$

the hexadecimal pattern that results from the local oscillator at a negative frequency amounts to $$F9\ F9\ F9\ 14\ 14\ 14 \tag{2}$$

i.e. the bit pattern or symbols "10" is changed to "01" and vice versa. In other words, the bit pattern (1) corresponds to the frame header and the bit pattern (2) corresponds to the so-called modified frame header with the local oscillator frequency being on the other (wrong) side (in the spectrum) of the signal.

Based on the status of the receiver, in particular two different scenarios may apply:
(a) If the receiver is an optical network unit (ONU) of a NGOA network operated in a wavelength search mode, the ONU sets a flag, e.g., an internal bit that triggers exchanging the symbols "10" and "01". This allows the ONU synchronizing correctly with the downstream data received. The ONU is in particular capable to read and decipher an almanac that is conveyed to the ONUs by a central unit, e.g., an optical line terminal (OLT). This almanac contains information about free and occupied wavelengths etc. Based on the information obtained from the almanac, the ONU is able to determine the wavelength it should use (i.e. wavelength to log on to) and the ONU can be tuned to this wavelength. The exchange flag mentioned can also be used to invert control loops for stabilization of the local oscillator tunable laser such that the local oscillator maintains a stable state with regard to the downstream signal while reading the almanac.
(b) If the receiver is an ONU which is already close to the wavelength it wants to log on to and a negative intermediate frequency is detected, a controlled frequency jump of the local oscillator to the other spectral side of the signal can be conducted such that the correct relative wavelength can be quickly determined.

FIG. 1 shows a schematic diagram comprising exemplary steps to be realized to enhance and in particular to accelerate the process of locking onto a signal for an optical receiver located, e.g., at the ONU.

In a step 101, the ONU (or its receiver) may scan for a signal at a predetermined frequency. The frequency may be pre-set or stored with the receiver. It may also—at least partially—be selected at random. In a step 102, the incoming stream is compared with the header (1) as well as with the modified header (2). A step 103 determines whether a valid header had been found.

If a valid header has been found in the data stream, the receiver may enter its locked state and obtain an almanac information from the header (see step 104). After the almanac has been obtained, the receiver can determine which frequency to use for receiving payload information that is addressed to this particular ONU. The ONU may thus tune to this frequency.

If no valid header was found, but a valid modified header could be detected (see step 105), the ONU changes the symbols "01" to "10" and vice versa (see step 106). The receiver is now capable of decoding the almanac information even if the frequency of the ONU's local oscillator is at the wrong side (in the spectrum). Based on the information provided by the almanac, the frequency of the local oscillator can be tuned to receive payload data (see step 107).

In case neither a valid header nor a valid modified header could be detected, the frequency to be scanned is changed according to a pre-defined scheme (see step 108) and a new scan is initiated (as indicated by the step 101).

Figure 2:
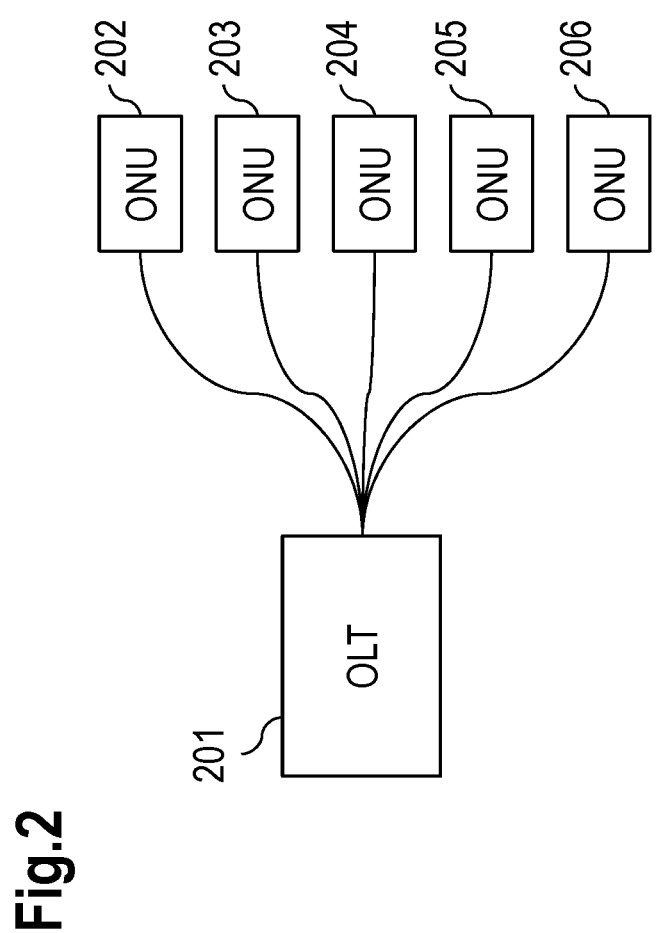
FIG. 2 shows an exemplary arrangement of an OLT as a centralized unit being (directly or indirectly) connected to several ONUs via several optical fibers.

FIG. 2 shows an exemplary arrangement of an OLT 201 as a centralized unit being (directly or indirectly) connected to several ONUs 202 to 206 via several optical fibers.

A NGOA system may provide a wavelength (or wavelength range) for every user or subscriber. It is noted that, e.g., ultra dense wavelength grid optical access systems can be referred to as NGOA which could provide for each subscriber, user or service (or group thereof) a separate wavelength (i.e. at least one wavelength range). Also, a particular wavelength (i.e. wavelength range) can be assigned to at least one subscriber, user or service.

Figure 3:
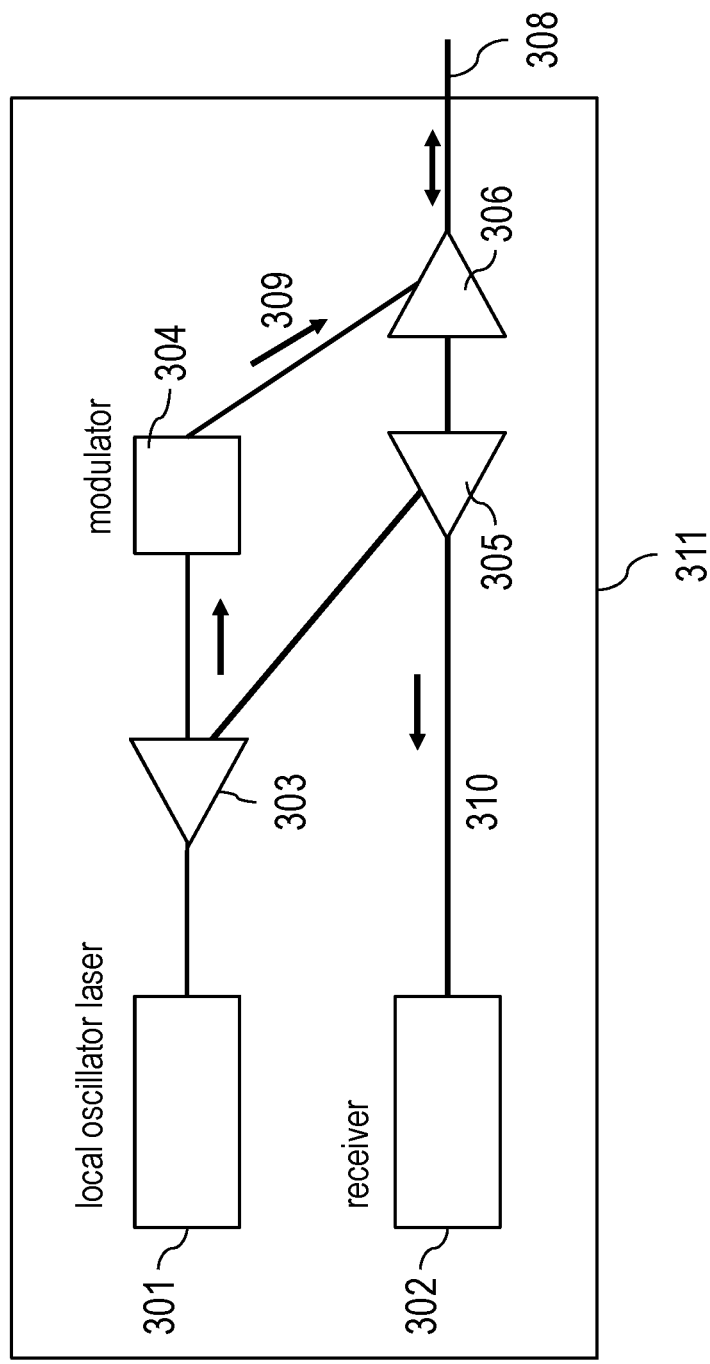
FIG. 3 shows an arrangement comprising a local oscillator laser, splitters, a modulator and a receiver, wherein such components could be part of an ONU.

FIG. 3 shows an arrangement comprising a local oscillator laser 301, splitters 303, 305, a splitter or circulator 306, a modulator 304 and a receiver 302. These components may be part of an ONU 311. An optical fiber 308 may be connected towards an OLT (not shown).

The signal generated at the local oscillator laser 301 is modulated via the modulator 304 to produce an upstream data signal 309 to be conveyed via the optical fiber 308. An incoming optical signal via fiber 308 is fed to the receiver 302. Also the signal generated at the local oscillator laser 301 is fed via splitters 303 and 305 to the receiver 302. Hence, the local oscillator laser 301 is used for modulation purposes to transmit the signal from the ONU 311 to the OLT and for reception purposes regarding the incoming received signal 310. For the latter purpose, the wavelength of the local oscillator laser 301 needs to be adjusted to the wavelength of the incoming signal. The approach described herein allows for an accelerated scanning process in order to detect the lock onto the incoming signal within a short period of time.

LIST OF ABBREVIATIONS

A/D Analog-to-Digital
DQPSK Differential Quadrature Phase Modulation
FEC Forward Error Correction
FTTB Fiber-to-the-Business
FTTC Fiber-to-the-Curb
FTTH Fiber-to-the-Home
IF Intermediate Frequency
LO Local Oscillator
NGOA Next Generation Optical Access
OLT Optical Line Terminal
ONU Optical Network Unit
OOK ON-OFF keying
PON Passive Optical Network
PSK Phase Shift Keying
QAM Quadrature Amplitude Modulation
QPSK Quadrature PSK
UDWDM Ultra Dense WDM
WDM Wavelength Division Multiplexing

The invention claimed is:
1. A method for processing data in an optical network element,
wherein the optical network element comprises a local oscillator operating at a first frequency;
receiving an incoming data stream at a second frequency;
processing the incoming data steam using the first frequency;
searching for a first pattern in the incoming data stream;

searching for a second pattern in the incoming data stream;
wherein the first pattern corresponds to the first frequency being in the spectrum on one side of the second frequency and the second pattern corresponds to the first frequency being in the spectrum on the other side of the second frequency.

2. The method according to claim 1, wherein the first pattern corresponds to a frequency inversion of the second pattern.

3. The method according to claim 1, wherein the incoming data stream is processed using the first frequency and the second frequency, in particular a difference frequency between the first frequency and the second frequency.

4. The method according to claim 1, wherein the incoming data stream is modulated by a multi-level phase modulated modulation scheme, in particular an n-ary PSK or an n-ary DPSK.

5. The method according to claim 1, wherein the first pattern corresponds to a header of a data frame and the second pattern corresponds to a modified header of the data frame.

6. The method according to claim 5, wherein the modified header comprises inverted In-Phase components compared to the In-Phase components of the header.

7. The method according to any claim 6,
wherein in an unlocked state the incoming data stream is compared with the header and with the modified header;
wherein the status changes from the unlocked state to a locked state when the header or the modified header is detected;
wherein an almanac information is obtained from the incoming data stream;
wherein a frequency is selected based on the almanac information.

8. The method according to claim 7, wherein the almanac information is obtained from the incoming data stream by inverting the In-Phase components in case the modified header has been detected.

9. The method according to claim 1, wherein the first frequency of the local oscillator is tuned to the other side of the second frequency in case the modified header is detected.

10. An optical network element, comprising:
a local oscillator operating at a first frequency;
a processing unit that is arranged for:
receiving an incoming data stream at a second frequency;
processing the incoming data stream using the first frequency;
searching a first pattern in the incoming data stream;
searching a second pattern in the incoming data stream;
wherein the first pattern corresponds to the first frequency being in the spectrum on one side of the second frequency and the second pattern corresponds to the first frequency being in the spectrum on the other side of the second frequency.

11. The optical network element according to claim 10, wherein the optical network element is an optical network unit or an optical line terminal.

12. A communication system comprising at least one optical network element according to claim 10.

* * * * *